No. 625,941. Patented May 30, 1899.
P. S. SINCLAIR.
PAPER MAKING APPARATUS.
(Application filed Mar. 4, 1899.)
(No Model.) 2 Sheets—Sheet 2.

Witnesses:
J. D. Garfield
M. A. Campbell

Inventor
Peter S. Sinclair
by Wm. L. Bellons
Attorney.

UNITED STATES PATENT OFFICE.

PETER S. SINCLAIR, OF HOLYOKE, MASSACHUSETTS.

PAPER-MAKING APPARATUS.

SPECIFICATION forming part of Letters Patent No. 625,941, dated May 30, 1899.

Application filed March 4, 1899. Serial No. 707,743. (No model.)

*To all whom it may concern:*

Be it known that I, PETER S. SINCLAIR, a citizen of the United States of America, and a resident of Holyoke, in the county of Hampden and State of Massachusetts, have invented certain new and useful Improvements in Paper-Making Apparatus, of which the following is a full, clear, and exact description.

This invention, relating to improvements in paper-making apparatus, more particularly pertains to improvements in the conduits and gate-provided branched connections for conveying and directing the paper pulp or stock from the engine to the drainers. Heretofore, as commonly practiced, the conduits have been made of wood and the branched connection equipments in which the gates are provided have been of metal, both of which, and more especially the branched connection portions, have become seriously deteriorated and corroded under the action of the moist plastic paper-stock conveyed through the conduit and directed through the branches by the shifting of the gate, necessitating their replacement at considerable expense and greater inconvenience.

The object of this invention is to make possible, and, in fact, entirely practicable and convenient, the employment of the conduits and the therein coupled gate-provided branched members which are composed of earthenware, such as Akron pipe, the invention more especially residing in the construction of the branch members of such material and in conjunction therewith the employment of efficient means for holding the conduits and coupled branches securely together and of means for accommodating and forming the supports or bearings for the shaft or stem, through means of which the position of the gate in the branch member is changed.

The invention is illustrated in the accompanying drawings, in which—

Figure 1:
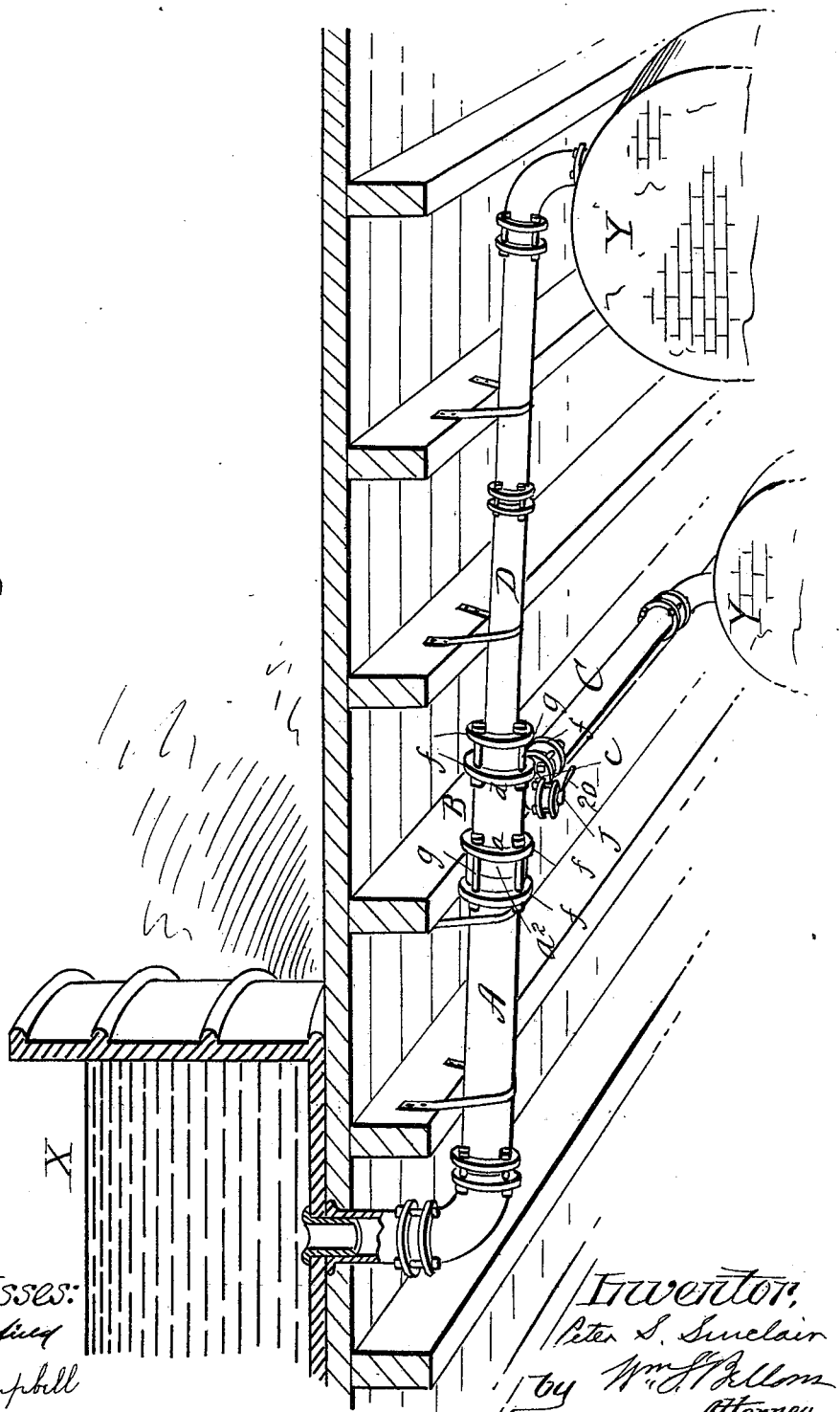
Figure 2:
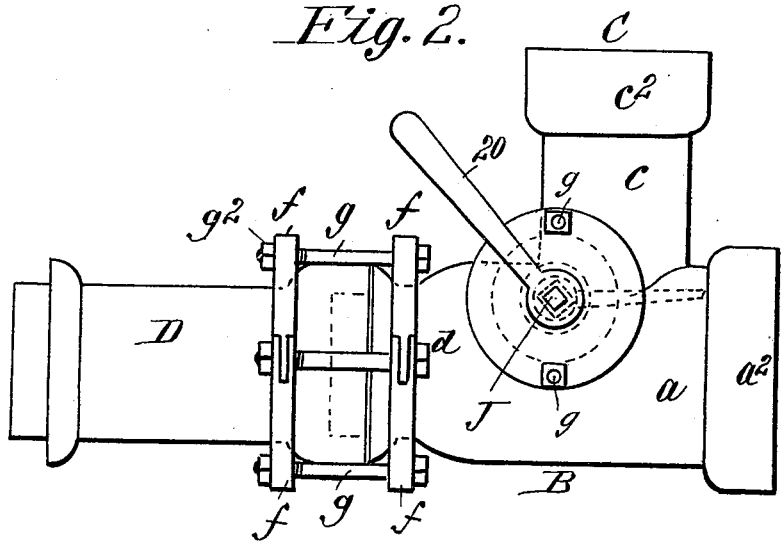
Figure 3:
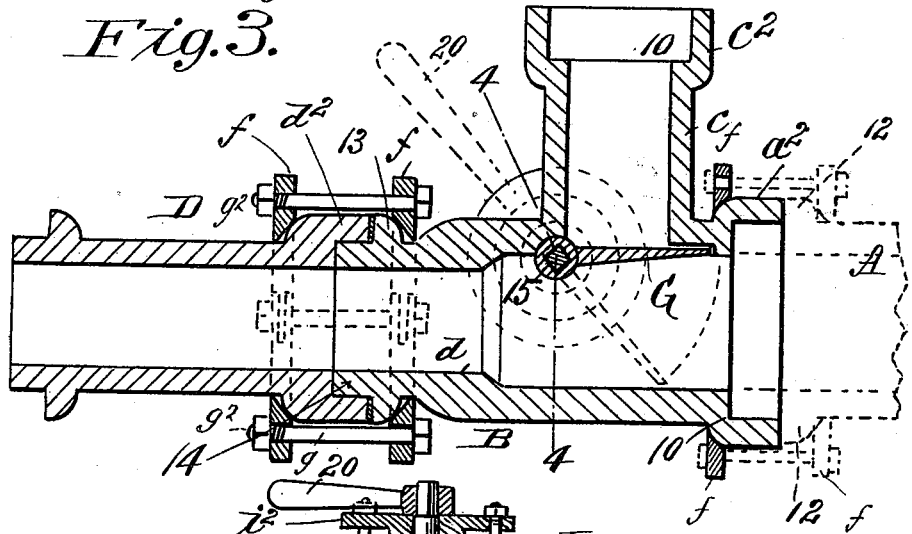
Figure 4:
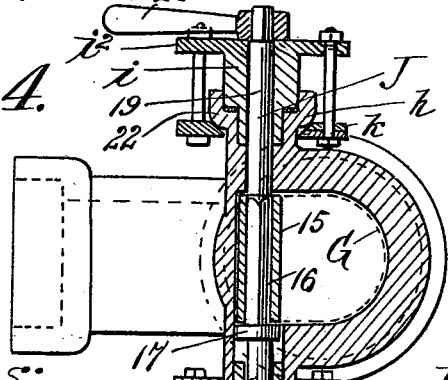

Figure 1 is a general view showing the arrangement of the coupled and branched members included in connection with the conduits between the engine and the drainer. Fig. 2 is a plan view showing one of the gate-provided branched coupling members and a conduit-section coupled to one branch thereof. Fig. 3 is a horizontal section centrally through the same. Fig. 4 is a vertical cross-section taken substantially on the line 4 4, Fig. 3, and showing more especially combined with the earthenware branched coupling the means for efficiently confining in place the metallic bearings or journal-supports for the shaft of the swinging gate or valve.

While I am of course aware that earthenware pipes made in sections with the end of one thereof sleeved into the enlargement in the end of the next have been employed in many places as the conduit for liquids and semiliquid masses, it has never been deemed feasible to employ these earthenware conduits and branched and valve-provided couplings in the conduits for the "stuff" or paper-pulp stock in paper-mills, for the reason of the impracticability, as heretofore believed, of providing in the branched coupled-in member made of this earthenware material the gate or shifting valve and suitable journal-bearings for the shaft on which it is mounted; but this I have found not only to be possible and practicable, but also to constitute a decided improvement in the conduit system for the paper-stock, resulting in great saving, especially in the replacement of the conduit parts and branches, as those heretofore required to be renewed at comparatively frequent intervals, while the equipment provided in accordance with this invention is permanent, or at least will last many times the length of the life of the kind heretofore used.

In the drawings, A represents the conduit which leads from the engine X to the branched coupling and gate-provided part B, which is made of earthenware or Akron pipe, and C and D represent conduits, also of the same composition, leading from the branches $c$ and $d$ of the coupling member B in lines at right angles to each other to the drainers Y. The branched coupling member B comprises the limb $a$, in line with the aforementioned limb or member $d$, while the limb $c$ is extended at right angles thereto, each of these members being hollow or tubular, and each of the ones $a$ and $c$ has the hollow end hub or enlargement $a^2$ $c^2$, with the seat 10, within and against which the externally-cylindrical tubular hub-like end of the therewith connected conduit is fitted with its flange 12, slightly distant from its end, facewise abutted against the outer end of the hub-like part $a^2$ or $c^2$. The branch or limb $d$, having the external flange 13 back of its hollow hub-like end 14, is sleeved into the seat enlargement $d^2$ therefor of the conduit-section D.

$ff$ represent split and detachably-connected rings or yokes of metal, one of which lies within and against and extends diametrically beyond the flange or shoulder 13 of the limb $d$ of the branched coupling member, while the other split ring is arranged opposite thereto, it having its bearing against the portion of the hollow hub enlargement $d^2$, adjoining the neck or where this portion terminates and merges into the smaller body of the conduit-section D. The rings or collars $f$ are formed in half-sections with interlocking tongues and comparatively deep grooves or receiving-sockets for the tongues, and the bolts $g$ $g$ are passed through the matched or tongue-and-grooved interlocked portions of the rings, the head of the bolt bearing against the outer face of the one ring, while the nut $g^2$ is set up against the farther side of the other ring. These bolts are passed through the interlocked portions of the rings, as mentioned, not only to serve to clamp the parts of the conduit-sections together, but hold the ring-sections together. Bolts may also be provided for clamping the rings between the ring-joints.

G represents the gate or valve, pivotally mounted at the junction of the walls of the branch members $c$ and $d$ of the part B, the same being adapted to be swung directly across the passage of the branch $c$, leaving the straight passage through the branch $a$ continued in the branch $d$ or to be swung across the straight passage, so that the stock in passing through the coupling member takes the angular course through the member $c$. This gate is made of brass or other suitable metal semicircular at one end and squared at the other or butt-end, as seen in Fig. 3, the edge of the squared end being constructed in the form of a thickened circular rib 15, having the square or otherwise polygonally-shaped hole through it for the engagement therewith of the squared intermediate part 16 of the metallic spindle or valve-operating shaft J. The spindle J below the squared portion 16 has the shoulder enlargement or flange 17, below which it has the circular portion 18 of suitable length to constitute one journal, while its opposite round end portion 19 constitutes the other journal and also the extension on which the valve-operating handle 20 is attached or engaged.

Socket-hubs $h$ $h$ are integrally formed with the branched coupling member B as hub-like projections at the top and bottom thereof, the common axial line of both being about coincident with the junction of the walls of the limbs $c$ and $d$, at which is located the butt-end of the valve, said hubs having within them the step-like or rabbeted seats for the metallic cylindrical journal-bearings $i$, which may be advantageously formed of iron. Each of the socket-hubs has at its end the external enlargement 22. Each journal-bearing $i$ is formed of two diameters, or step-like, the inner end portions being the smaller and adapted to be seated and suitably packed in the socketed hubs $h$ $h$ of the earthenware fitting B, and each of these metallic journal-bearings is furthermore provided at its outer end with the considerably-widened flange $i^2$. These end-flanged metallic centrally-drilled journal-bearing members $i$ $i$ are held firmly within their seats in the integral socket-hubs of the earthenware coupling member by the detachable split clamping-rings $k$ $k$, which lie next within and against the shoulder-enlargements 22 of the socket-hubs, and the clamping-bolts which pass through both the rings and the flanges $i^2$, the same being headed at one end and receiving nuts at the other. The split rings $k$ are constructed and applied in substantially the same manner as the hereinbefore-described clamping-rings $ff$.

In the assemblage of the parts pertaining to the journaling of the gate the gate is introduced in place with its apertured ribbed-base end in the axial line of the socket-hubs, the shaft G is passed through it from the under side of the branched coupling B until the shoulder has been brought up against the lower edge of the valve, the centrally-drilled round journal-blocks $i$ $i$ are brought to place over and about the round portion at the opposite extremities of the shaft and seated in the sockets therefor in the parts $h$ $h$ and confined by the clamping rings and bolts, the screw-plug $m$ is screwed centrally into the under journal to endwise contact against the lower end of the shaft, and the lever or handle 20 is engaged at the upper end of the shaft therewith.

Having thus described my invention, what I claim, and desire to secure by Letters Patent, is—

1. In combination with the pulp-carrying conduit of paper-making apparatus, a branched coupling member comprising two tubular limbs in line and a third limb intermediately and angularly arranged and all formed of earthenware having at its sides opposite the junction of the angular limb with the other limbs, socket-hubs integrally formed of said ware, metallic journals seated in said socket-hubs, a shaft rotatably mounted in said journals and carrying a gate-valve adapted to be swung to leave a straightway passage from the inlet branch of the device through the branch which is in line therewith, or to be closed across the latter branch leaving the clear passage-way from the inlet branch through the angular member, substatially as described.

2. In combination with the pulp-carrying conduit of paper-making apparatus, a branched coupling member comprising two tubular limbs in line and a third limb intermediately and angularly arranged and all formed of earthenware having at its opposite sides opposite the junction of the said limbs, socket-hubs integrally formed of said earthenware and provided with the external end shoulders 22, metallic journals seated in said socket-hubs, having outer end flanges, split and detachably confined rings engaged under and against said shoulders 22, and the bolts passing through said rings and the journal-flanges, a shaft rotatably mounted in said journals and carrying a gate-valve adapted to be swung to leave open the straightway passage from the inlet branch, or the angular branched passage, substantially as described.

3. In combination with the pulp-carrying conduits of paper-making apparatus, a branched coupling member comprising two tubular limbs in line and a third limb intermediately and angularly arranged and all formed of earthenware having at its sides opposite the junction of the angular limb with the other limbs, socket-hubs integrally formed of said ware, metallic centrally-drilled journals seated and confined in said socket-hubs, a shaft rotatably mounted in said journals and carrying a gate-valve adapted to be swung, substantially as and for the purpose described, and having a handle at its one end and a screw-plug $m$ screwing centrally into the one journal against the end of the shaft.

4. In combination with the pulp-carrying conduits of paper-making apparatus, a branched coupling member C comprising two tubular limbs $a$, $d$, in line, and a third limb $c$ intermediately and angularly arranged and all formed of earthenware having at its opposite sides opposite the junction of the said limbs, socket-hubs $h\ h$ integrally formed of said earthenware and provided with the external end shoulders 22, cylindrical and externally step-shaped metallic journals, $i\ i$, seated in said socket-hubs, having outer end flanges $i^2$, split and detachably-confined rings $k\ k$, engaged under and against said shoulders 22, and the headed bolts passing through said rings and the journal-flanges, a shaft rotatably mounted in said journals formed with the squared central part 16 with the shoulder 17 and the round end portions 18 and 19, the gate-valve G having at its base end the squared perforation through which the squared part of the shaft engages, and the screw-plug $m$, centrally entered into one of the journals against the end 18 of the valve-shaft, substantially as described.

PETER S. SINCLAIR.

Witnesses:
WM. S. BELLOWS,
M. A. CAMPBELL.